F. D. LAMBERT & R. R. RESCH.
REVERSIBLE ROTARY ENGINE.
APPLICATION FILED MAY 8, 1911.
1,029,616.
Patented June 18, 1912.
9 SHEETS—SHEET 2.
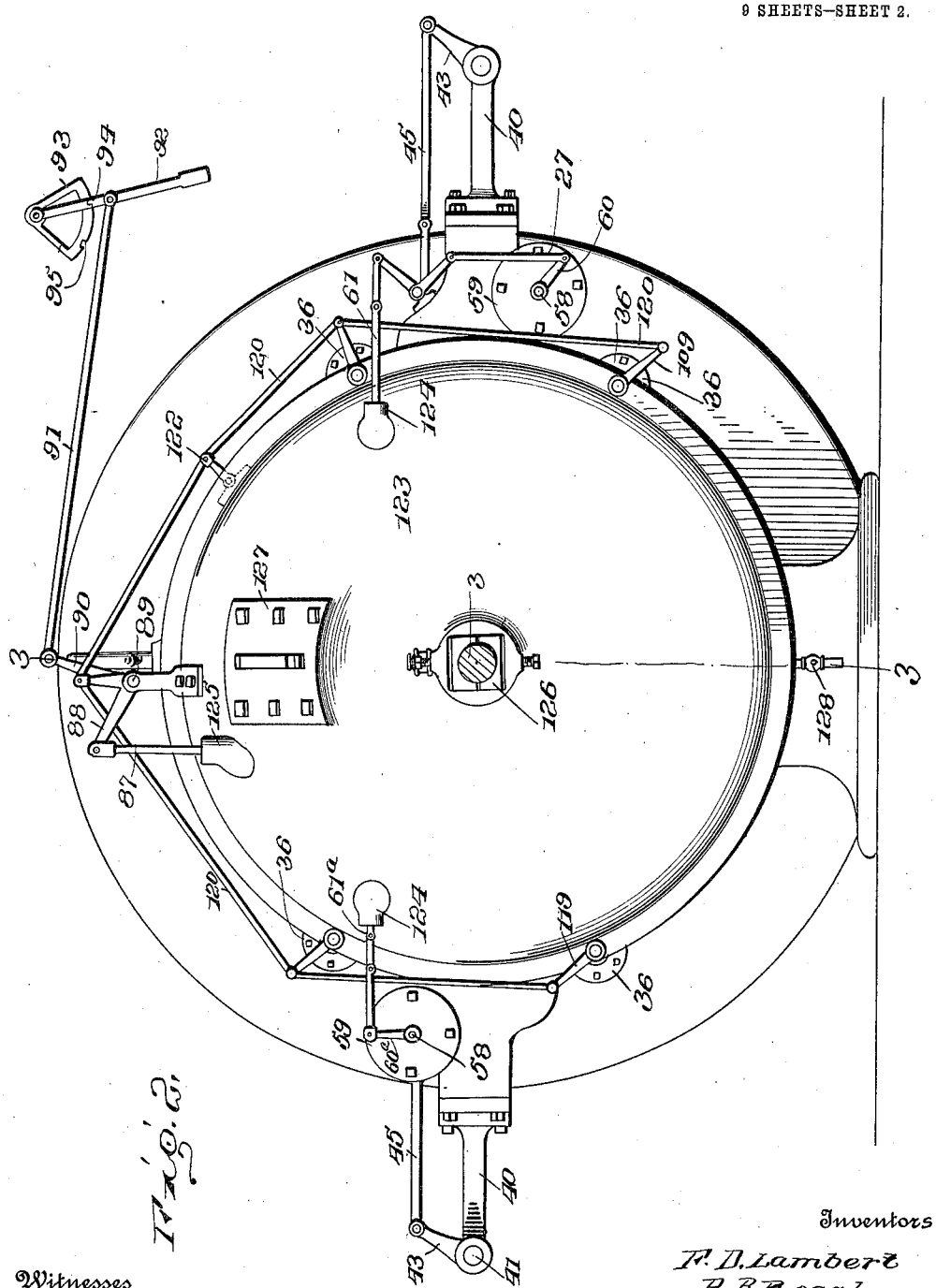
Witnesses
W. N. Woodson
Cora H. Handy.
Inventors
F. D. Lambert
R. R. Resch
By
Attorneys

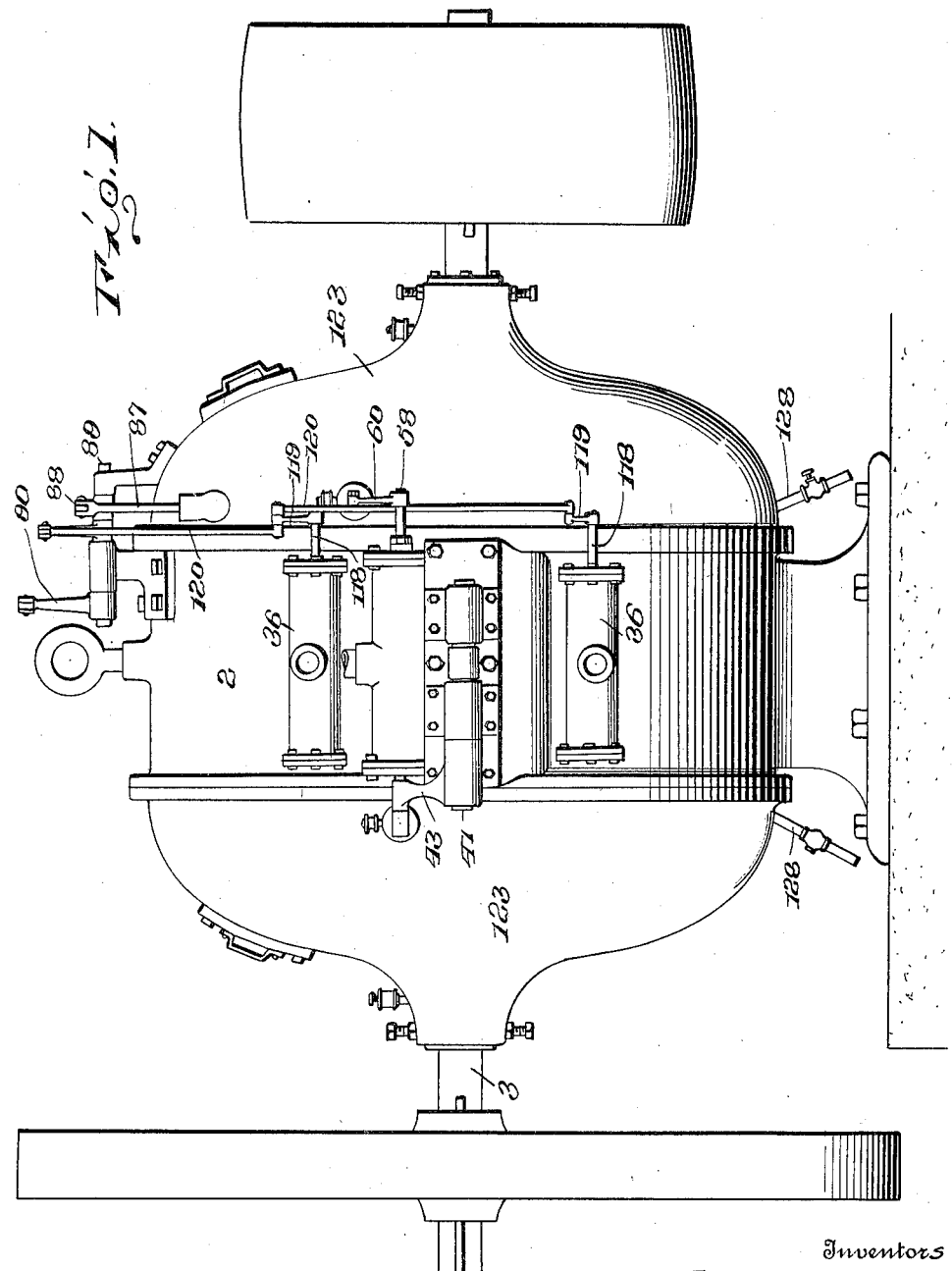

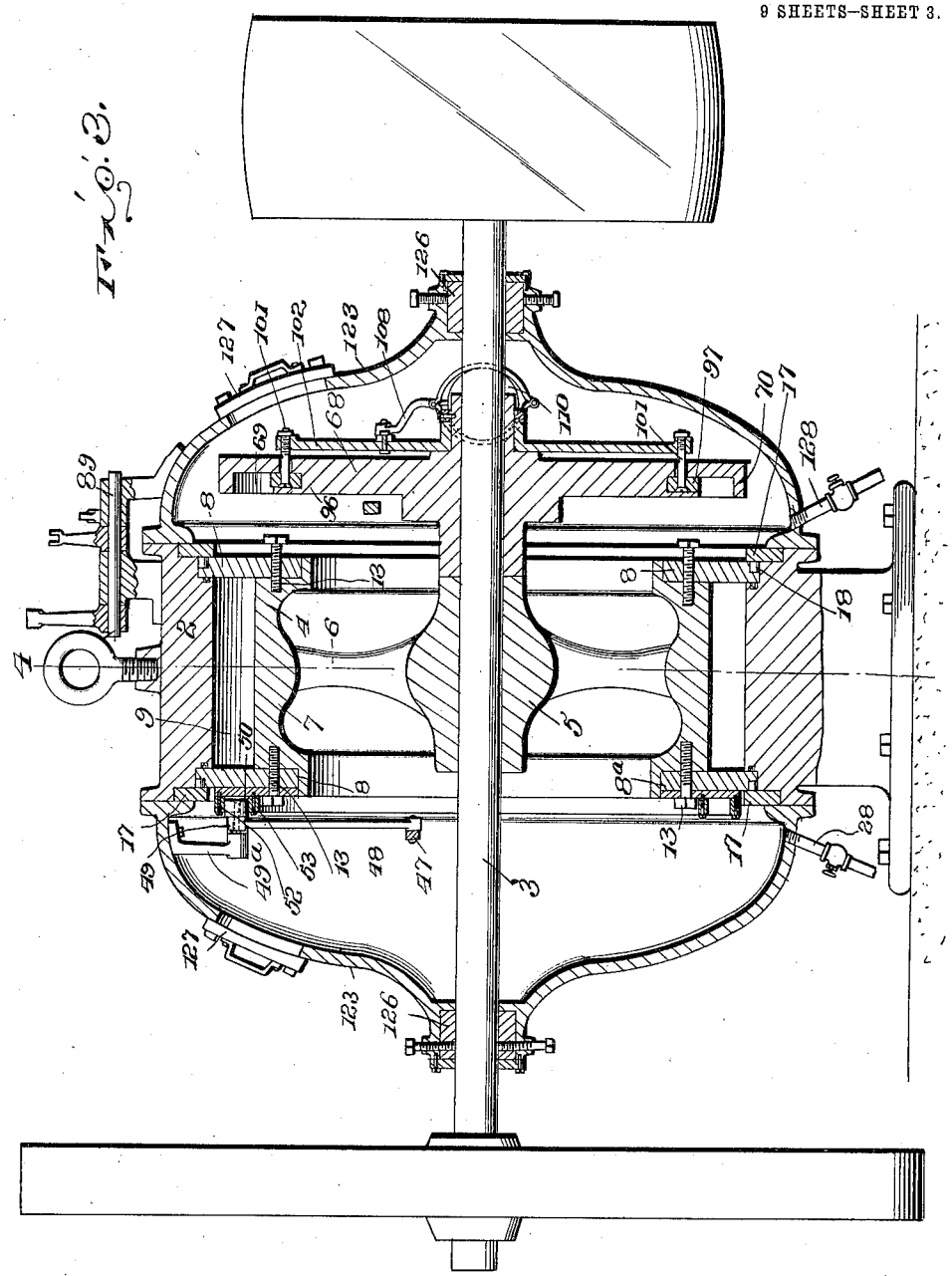

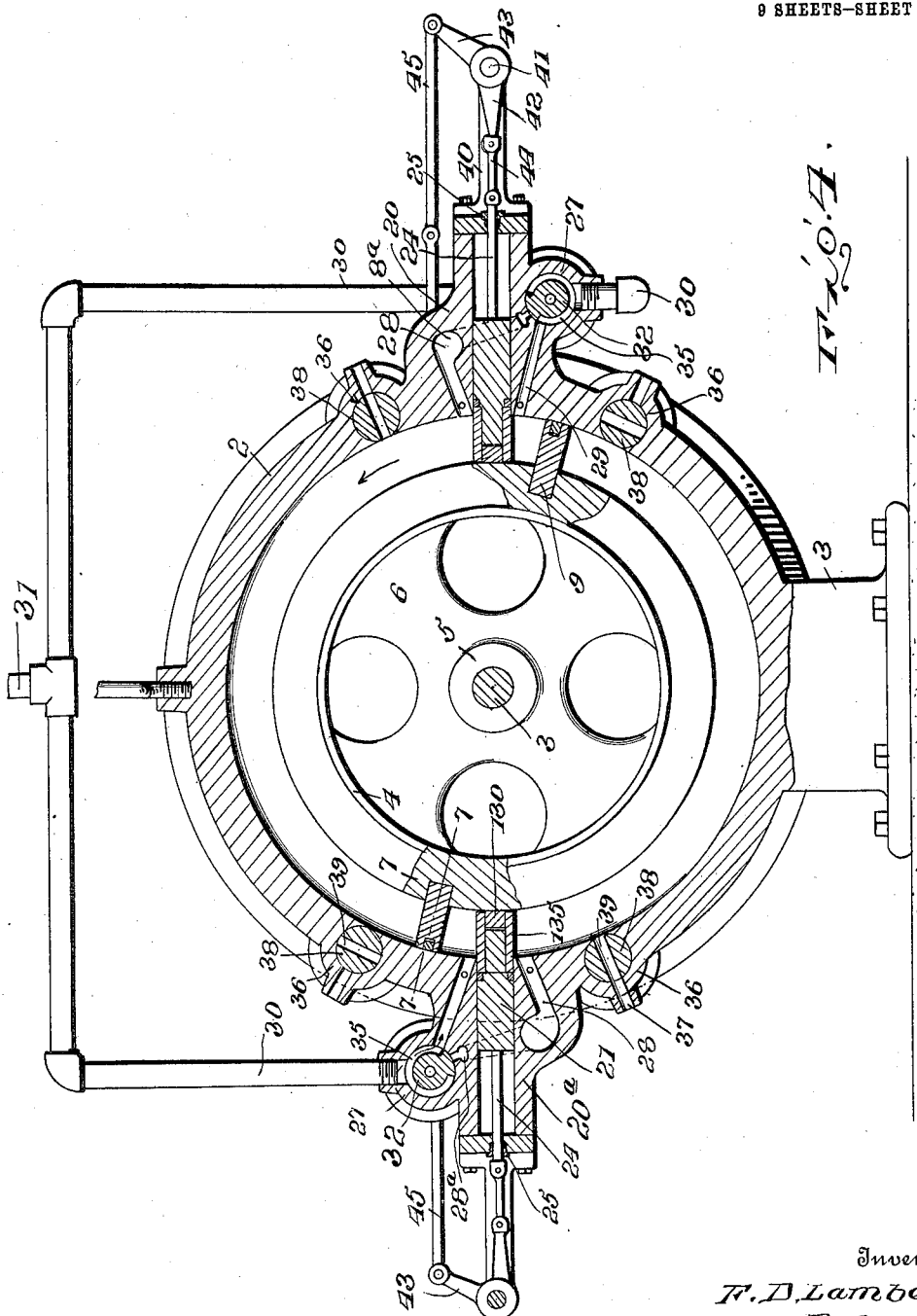

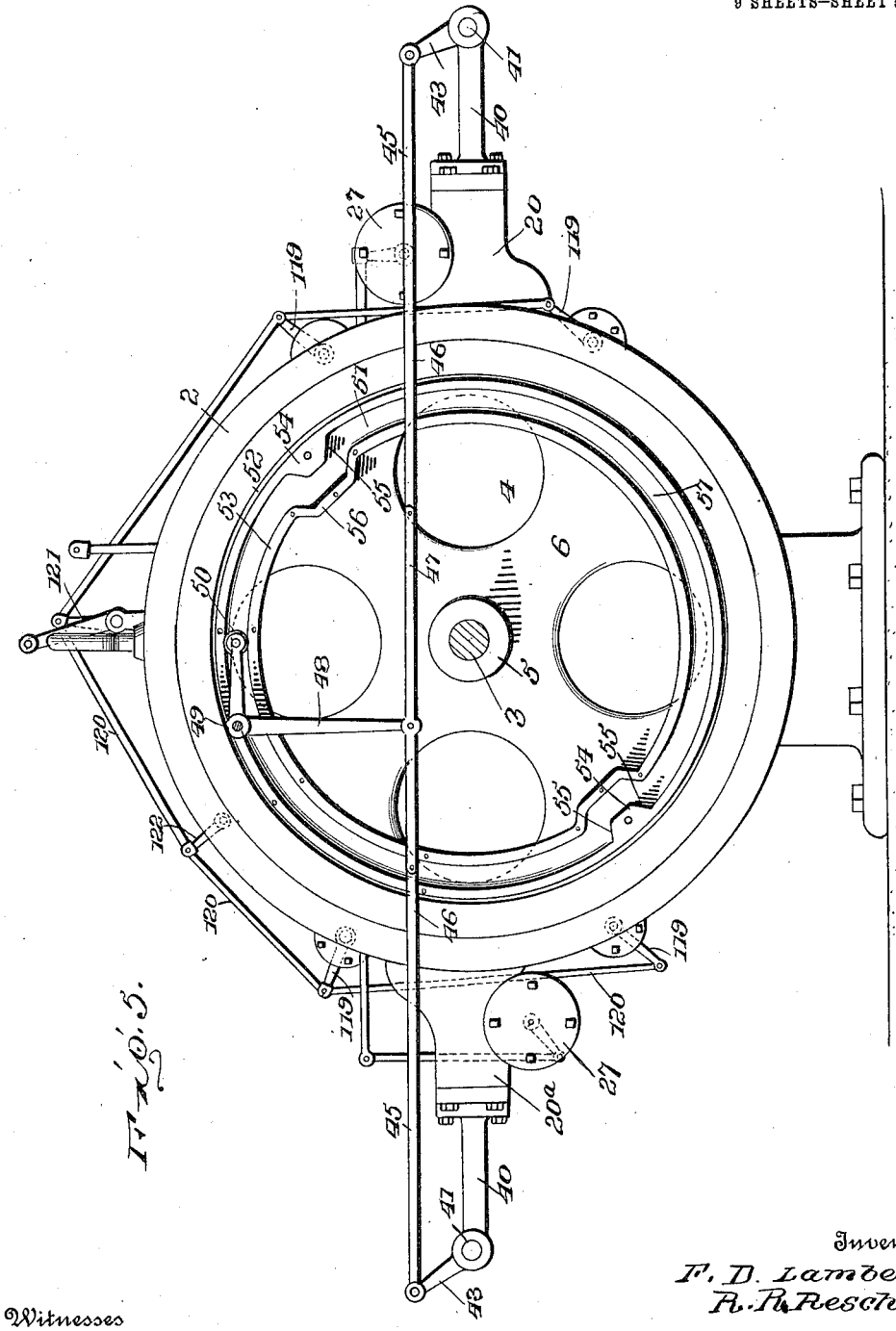

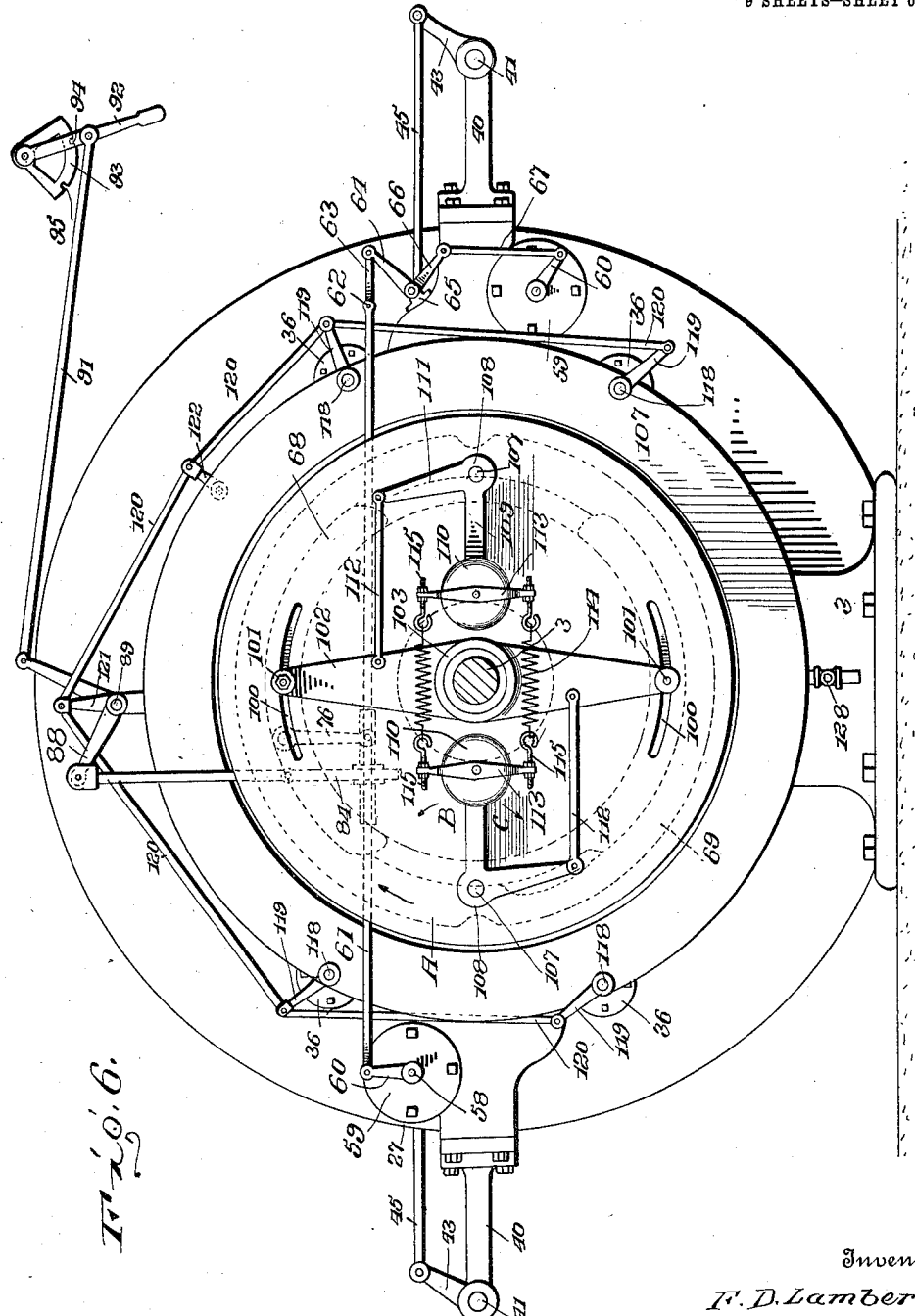

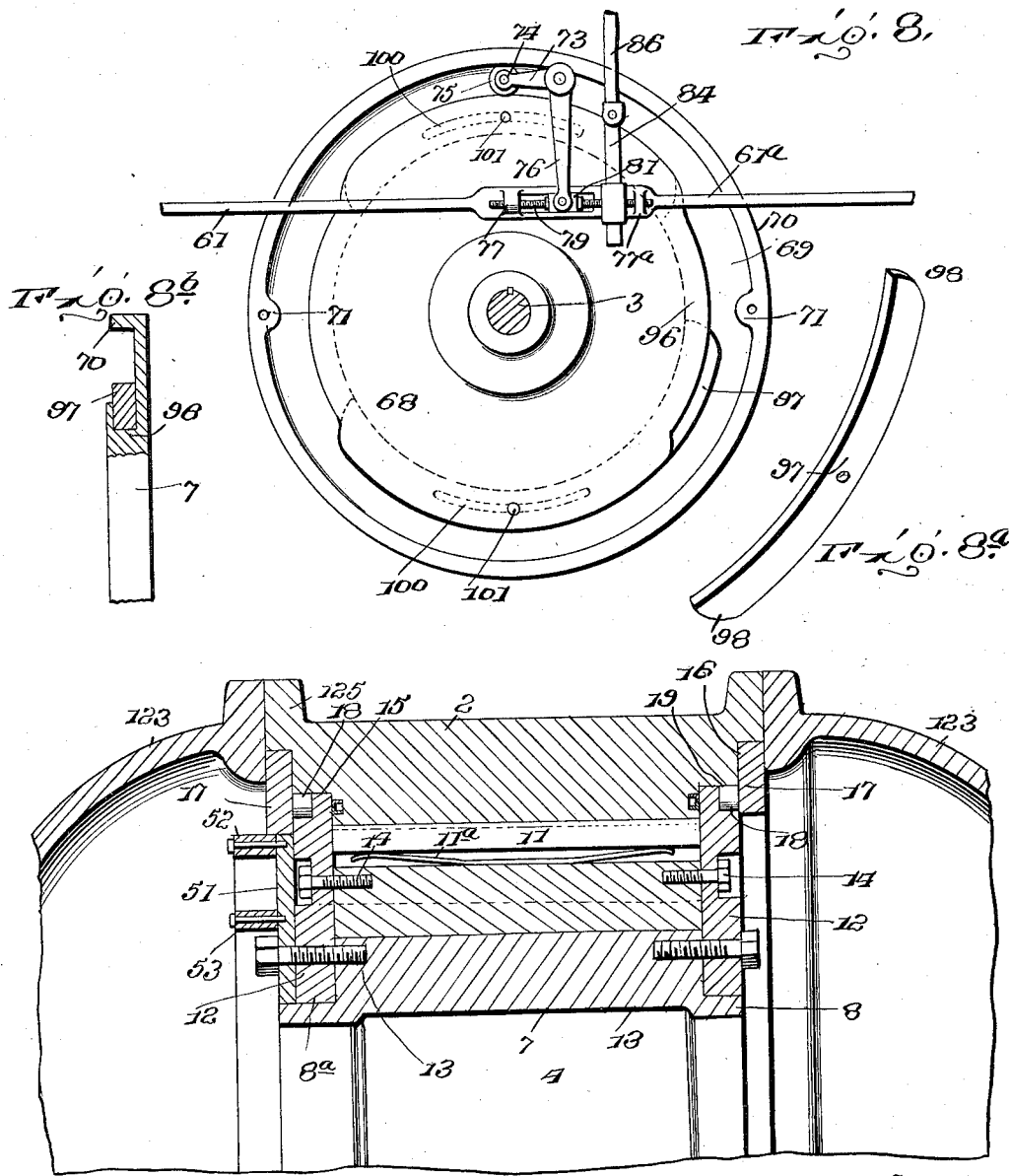

F. D. LAMBERT & R. R. RESCH.
REVERSIBLE ROTARY ENGINE.
APPLICATION FILED MAY 8, 1911.
1,029,616.
Patented June 18, 1912.
9 SHEETS—SHEET 8.
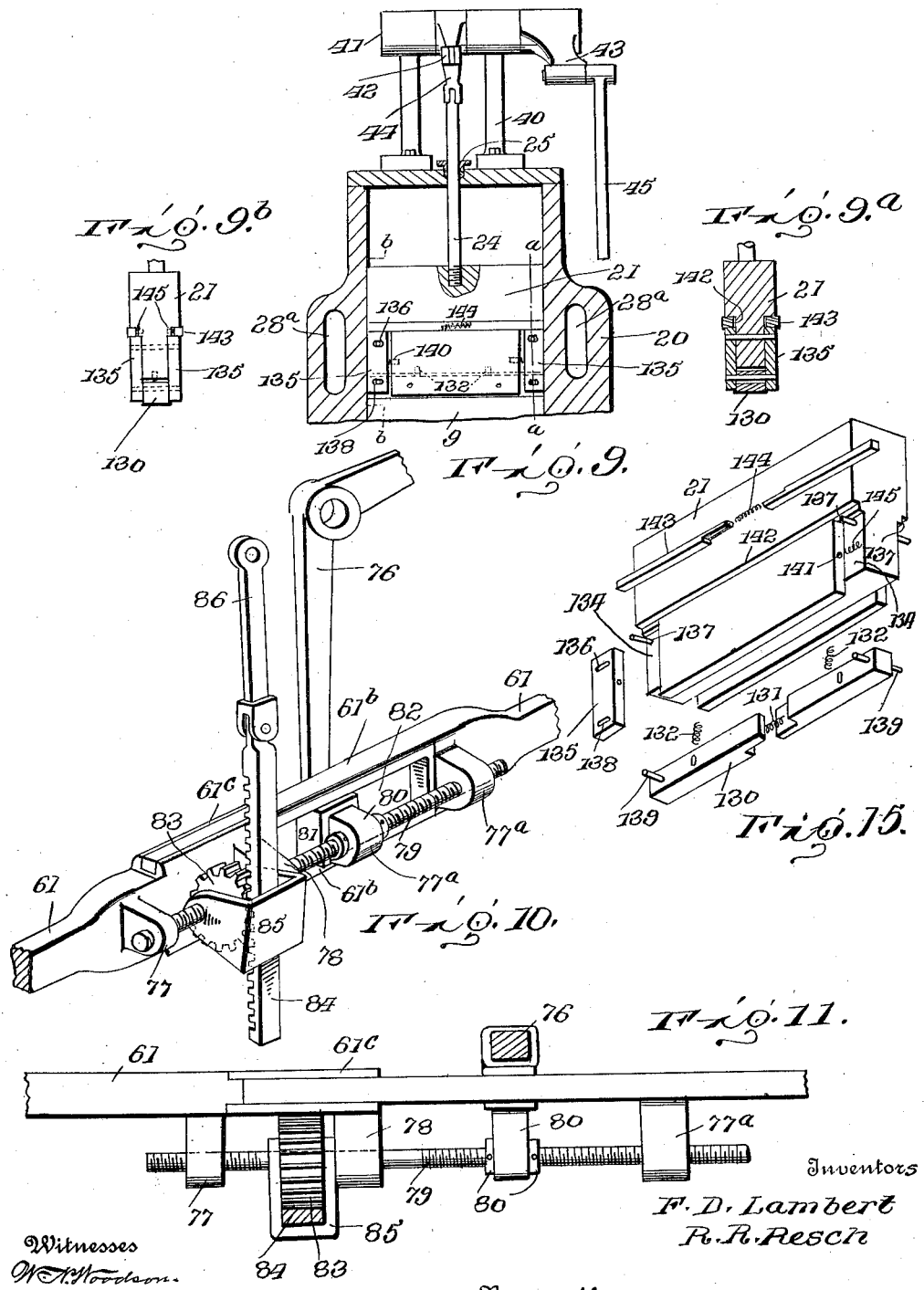

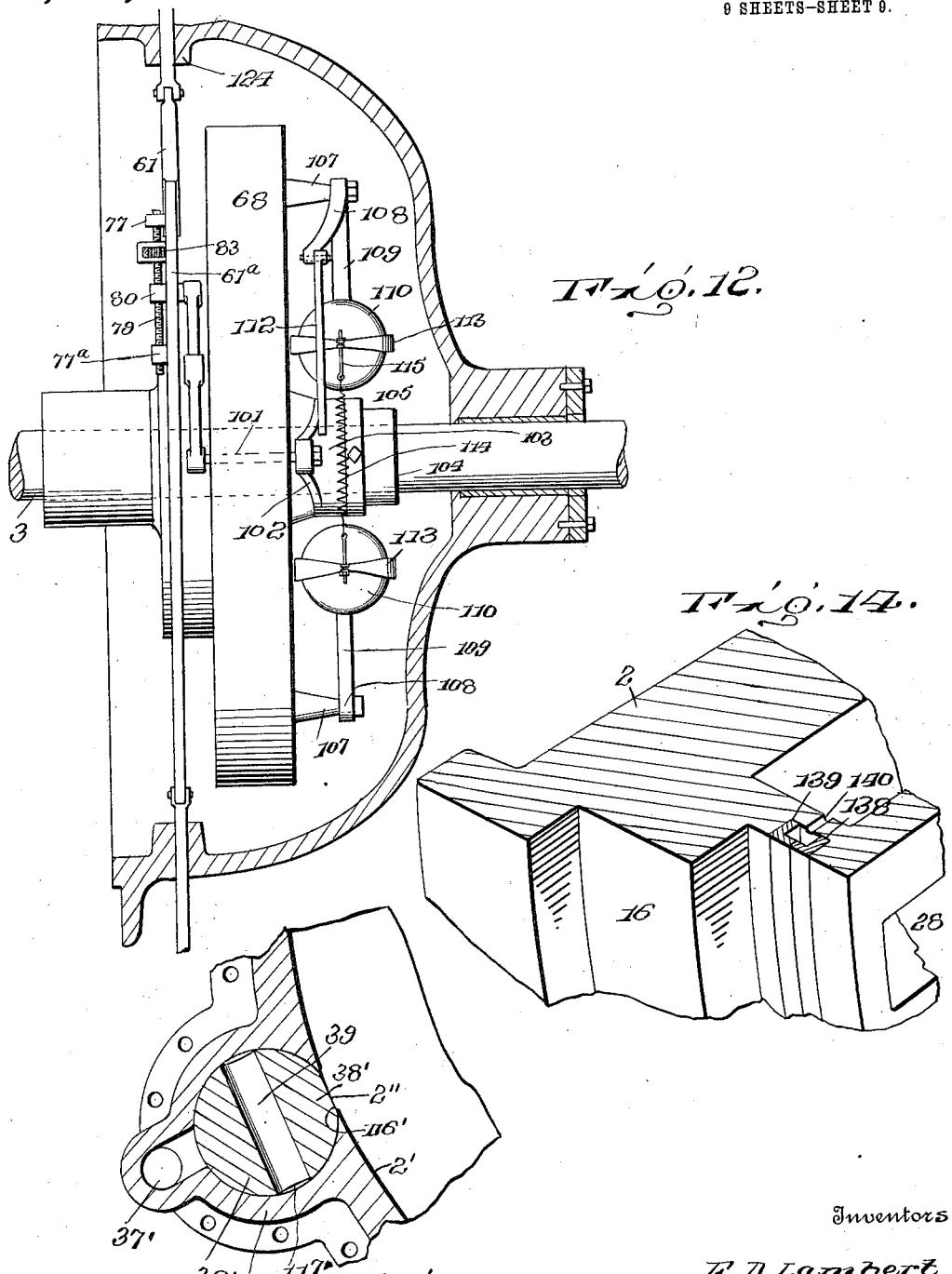

UNITED STATES PATENT OFFICE.

FLOYD D. LAMBERT AND RALPH R. RESCH, OF TRINIDAD, COLORADO.

REVERSIBLE ROTARY ENGINE.

1,029,616.

Specification of Letters Patent. Patented June 18, 1912.

Application filed May 8, 1911. Serial No. 625,833.

*To all whom it may concern:*

Be it known that we, FLOYD D. LAMBERT and RALPH R. RESCH, citizens of the United States, residing at Trinidad, in the county of Las Animas and State of Colorado, have invented certain new and useful Improvements in Reversible Rotary Engines, of which the following is a specification.

Our invention relates to engines of the rotary type and particularly to certain improvements on the rotary engine invented by us and described in our Patent Serial No. 569,574, filed on the 29th day of June, 1910.

The primary object of this invention is the provision of a rotary engine which may be easily reversed, and herein the steam admission valves are controlled by a cam of peculiar form rotatable with the rotor, the cam being so mounted that it may be shifted to adjustably control the movement of the valves, the point of cut off being adjustably controlled by a governor rotatable with the rotor.

A further object of the invention is to so construct the rotor and the casing that steam shall not escape and that the friction between the rotor and casing may be reduced to a minimum.

A further object is to provide means actuated by one lever whereby the exhaust valves and the steam admission valves may be reversed, and whereby the abutments may be lifted out of engagement with the rotor when desired.

A further object is to improve upon the rotary valves illustrated in our prior application, above referred to, by so constructing the valves that the steam passes around the valves instead of going through them.

Other objects will appear in the course of the following description.

In general terms, our invention includes a substantially cylindrical rotor casing in which is mounted a rotor, the rotor having a plurality of radially arranged blades fixedly mounted upon the rotor and engaging with the inner circumference of the rotor casing. Mounted in the rotor casing are a plurality of radially shiftable abutments, corresponding in number to the number of blades on the rotor. Means are provided whereby as a blade approaches an abutment, the abutment is automatically shifted out of the way of the blade in order to permit it to pass and return to its engagement with the rotor after the passage of the blade. On each side of each abutment are located admission ports, and valve mechanism is provided whereby the steam or other motive fluid is admitted to one or the other of the admission ports of all the sets of admission ports, depending upon the direction in which the rotor is traveling. The rotor casing is also provided with a plurality of exhaust ports, also arranged on each side of the abutments, the exhaust ports being reversible so that the exhaust port of one set is closed while the other exhaust port of the same set is opened, means being provided whereby the exhaust ports may be controlled in accordance with the movement of the steam admission valves. The steam admission valves and the exhaust ports are controlled by a cam mechanism mounted to rotate with the rotor, as will be later described.

Our invention is illustrated in the accompanying drawings wherein:

Figure 1 is an end elevation of our improved engine. Fig. 2 is a side elevation thereof looking from the right hand end of Fig. 1. Fig. 3 is a vertical section on the line 3—3 of Fig. 2. Fig. 4 is a vertical section on the line 4—4 of Fig. 3. Fig. 5 is an end view of the rotor and rotor casing looking from the left hand end of Fig. 3, the adjacent end plate of the rotor casing being removed. Fig. 6 is an end elevation of the rotor and middle portion of the rotor casing, the adjacent end plate being removed and the rotor shaft being shown in section. Fig. 7 is an enlarged section on the line 7—7 of Fig. 4. Fig. 8 is a face view of the cam for operating the admission valves and a portion of the connecting rod whereby the valves are actuated. Fig. 8$^a$ is a perspective view of one of the adjustable cam plates coacting with the cam disk. Fig. 8$^b$ is a fragmentary sectional view on the line $b$—$b$ of Fig. 8. Fig. 9 is an enlarged fragmentary section through the abutment casing and the abutment. Fig. 9$^a$ is a vertical sectional view on the line $a$—$a$ of Fig. 9. Fig. 9$^b$ is a sectional view on the line $b$—$b$ of Fig. 9. Fig. 10 is a detail perspective view of a portion of the valve operating connecting rod and the means whereby the valves are reversed. Fig. 11 is a top view of the structure shown in Fig. 10, the bell crank lever 76 being in section. Fig. 12 is a fragmentary end elevation of a portion of the rotor with the valve operating mechanism connected thereto, the end plate of the rotor casing being in section. Fig. 13 is an enlarged sectional detail view of one of the exhaust valves and its casing. Fig. 14 is an enlarged detail section of a portion of the rotor casing adjacent to one of the steam inlet ports showing a packing strip in place therein, the packing strip being in section. Fig. 15 is a perspective detail view of the abutment and the packing therefor, the packing being detached from the abutment.

Referring now to Figs. 1, 2, 3, 4 and 7, it will be seen that we provide a substantially cylindrical rotor casing 2 which is mounted upon a base. Extending centrally through the rotor casing is a shaft 3 upon which is mounted the rotor 4, this rotor comprising a hub 5 fixed to the shaft 3, the radially extending web 6 and the rim 7, this rim projecting laterally on each side beyond the web 6. The outer edges of the annular rim 7 are recessed as at 8 and 8ª. Mounted in transversely extending recesses formed upon the rim 7 are the transversely extending blades 9, the blades being set into these recesses as illustrated in Fig. 4. These blades 9 are longitudinally recessed as at 11 for the reception of packing strips, this packing being supported upon a bowed spring 11ª, as illustrated in Fig. 7, so that the packing is forced outward against the inner face of the rotor casing and into steam-tight engagement therewith. The springs 11ª, however, are not so strong as to force the packing into very tight frictional engagement with the inner face of the rotor casing. Mounted in the recesses 8 and 8ª are the annular plates 12, both these plates being substantially like each other. It will be noted that the recess 8ª is somewhat deeper than the recess 8, for a purpose to be hereafter described. The plates 12 are bolted to the rim of the rotor by bolts or screws 13 which hold the annular plates 12 detachably in place. The faces of the plates 12 are also countersunk at intervals for the reception of the heads of screws 14 which pass through the plates 12 and into engagement with the blades 9, as illustrated in Fig. 7. It will be seen that by removing the screws 13 and 14, the plates may be removed and the blades removed. The plates 12 project beyond the outer faces of the blades 9, and these projecting edges of the plates 12 extend into corresponding annular recesses 15 formed in the opposite ends of the rotor casing. In other words, the annular plates 12 project beyond the inner face of the rotor casing and overlap the rotor casing. The ends of the rotor casing are also recessed at 16 for the reception of annular plates 17, these plates holding in position the antifriction rollers 18 which are disposed within a recess 19 formed in the outer side faces of the plates 12. The plates 12 thus bear against the rollers 18 so that the frictional engagement between the rotor and the casing thereof is reduced to a minimum. It will be seen that by removing the plates 17 the antifriction rollers 18 may be removed, repaired or replaced, and the parts oiled or otherwise lubricated. By this construction we secure a practically steam-tight engagement between the rotor and the casing surrounding it, while at the same time reducing the friction of the parts to a minimum. Furthermore, the parts being constructed as described may be easily disassembled so that the rotor may be removed or repaired. It will be seen that the plates 17 assist in holding the rotor in place in proper engagement with the rotor casing so that the parts shall not bind upon each other or tend to get out of proper alinement.

As shown in Fig. 4, the rotor casing 2 is provided at opposite points of its periphery with the enlarged portions 20, each of the enlarged portions forming a casing for a sliding abutment 21. The abutment 21, as illustrated in Fig. 9, has a width equal to the width of the blades 9 between the plates 12, and as shown in Fig. 4 this abutment 21 is normally forced inward so that its inner edge is in contact with the outer face of the rotor 4. Preferably the edge of the abutment is provided with a packing strip 130 whereby a steam-tight contact is secured between the inner face of the abutment and the outer face of the rotor, and also with laterally extending packing strips 135 whereby a steam-tight engagement is secured between the faces of the abutment and the interior of the casing in which the abutment moves. The detailed construction whereby this may be secured will be described later. Attached to the outer extremity of each abutment is the plunger rod 24 which extends out through a stuffing box 25 formed in the end of the abutment casing. This plunger 24 is connected to means whereby the abutment is automatically shifted out of the way of an approaching blade and automatically shifted inward against the face of the rotor after the blade has passed. This mechanism will be later described.

On each side of each of the abutments 21 are located the steam admission ports 28 and 29, both of these ports 28 and 29 being connected to a circular valve casing 27. Each valve casing is connected by a supply pipe 30 to a source of steam, the supply pipes as illustrated in Fig. 4 both connecting to a common conducting pipe 31 leading from the boiler of the engine.

Located within each of the valve chambers 27 is the rotatable valve 32, illustrated in detail in Fig. 4. Each valve consists of a spool-shaped body portion, the end flanges 33 of which are connected at one end in their diameter by a transverse web 34. A passageway 35 is thus provided which extends nearly entirely around the valve.

It will be noted from Fig. 4 that the valves 32 are placed diametrically opposite to each other, so that one of the valves is below its abutment casing while the other valve is above the adjacent abutment casing. When these valves are turned in one position, they will connect the port 28 with the pipe 30, while when turned in the other position they will connect the pipe 30 with the port 29. When the inlet pipe 30 is connected to the port 29, the engine will move in the direction of the arrow in Fig. 4, while when it is turned so as to connect the port 28 with the pipe 30, the engine will move in a direction reverse to the arrow in Fig. 4.

Formed in the rotor casing 2 are the exhaust valve chambers 36. There are a pair of these valve chambers for each abutment and for each pair of admission ports, these valve chambers being located on each side of the abutment and beyond the admission ports. Each valve chamber is connected to the exterior of the casing by a passage 37.

Located within the valve chambers 36 are the exhaust valves 38. These exhaust valves each have a transverse passage or port 39 extending diametrically through them. When the valve 38 is turned with its passage perpendicular to the circumference of the rotor 4, communication is established between the interior of the rotor casing and the exterior air. When the valve is turned so that its passage 39 is approximately parallel to the inner face of the rotor casing, then this communication is cut off. It will be seen from Fig. 4 that one exhaust valve of each pair of valve chambers is turned so that communication is established between the interior of the rotor casing and the outside air, while the other valve is turned so that communication is cut off. The two exhaust valves of each pair of valves are set at right angles to each other so that a quarter turn will close off one exhaust valve of the pair and open the other.

By reference to Fig. 4, it will be seen that steam entering the casing 2 by means of the ports 29 will act upon the blades of the rotor and turn the rotor in the direction of the arrow. As the blades near the abutments 21, the abutments will be shifted out of the way by a mechanism to be hereafter described so as to permit the blades to pass. Just before the blades reach the abutments, they will pass the open exhaust valves 38 and the exhausted vapor behind the blades will pass out through the exhaust openings 37. It will be obvious that by properly controlling the valves 32, steam may be admitted during the whole travel of the blade from one abutment to the other, or that it may be cut off at any desired point of travel. This action is secured by means of the mechanism to be described later.

As a means for actuating the abutments so as to remove them from the path of the blades as the blades approach the abutments, we provide the following instrumentalities. Mounted upon the end 26 of the abutment casing as illustrated in Fig. 9 are the parallel brackets 40, having bearings at their ends supporting a rock shaft 41 which projects at one end beyond the brackets. Attached to the rock shaft 41 is an arm 42 which connects by a link 44 with the rod 24 which actuates the abutment. Also mounted upon the projecting end of the rock shaft 41 is the arm 43 which is pivotally connected to a link 45. It will be seen from Fig. 4 that the arms 43 for actuating the two abutments are reversely set to each other so that a reciprocation of the arms 43 in one direction will act to withdraw both abutments simultaneously from the path of movement of the blades, and that a movement of the arms 43 in the reverse direction will act simultaneously to return both of the abutments into contact with the outer face of the rotor. The links 45 in turn are pivotally connected to links 46 which pass through a guide opening formed in the end wall of the motor casing. These links 46 are connected to each other by a connecting rod 47, pivotally engaged by the depending arm 48 of a bell crank lever mounted on a bracket 49$^a$. The other arm of the bell crank lever 49 is provided with a roller 50. In order to actuate the bell crank 49 to give a reciprocating movement to the connecting rod 47, we attach to the end of the rotor casing 2 the annular cam plate 51, this plate being held in place by the bolts 13, as illustrated in Fig. 7. Projecting from the outer face of the cam plate are the parallel cam walls 52 and 53. As shown in Fig. 5, these walls 52 and 53 are spaced from each other just sufficiently to accommodate the roller 50. The cam wall 52 at opposite points in its diameter is formed with the inwardly projecting lugs or protuberances 54 having inclined ends 55, while the cam wall 53 is correspondingly inwardly depressed as at 56 so that a cam track 57 is formed between the walls 52 and 53. It will be obvious that a rotation of the cam ring 51 will cause the roller 50 to be moved inward and then outward, twice for each rotation of the rotor. An inward movement of the roller 50 and the arm 49 will of course move the connecting rod 47 in a direction to withdraw the abutments from their engagement with the face of the rotor, while the outward movement of the arm 49 will cause the abutments to return to their original position. Both abutments move simultaneously outward and simultaneously inward.

Each of the valves 32 has projecting therefrom a spindle 58 which passes through a bonnet 59 of the valve chamber. Attached to each spindle is a radially extending arm 60 and 60ª, as shown in Figs. 2 and 6. These arms are connected to each other so that the valves shall operate simultaneously, the connection being illustrated in Fig. 6. To the valve arm 60ª is attached a connecting rod 61, the detailed construction of which is shown in Figs. 8 and 10, this rod 61 extending across the end of the engine and being pivotally connected at 62 with a link 63, connected in turn to one arm 64 of a bell crank lever mounted upon a bracket 65. The arm 66 of the bell crank lever is in turn connected by a link 67 to the arm 60 of the other valve. It will be seen, therefore, that the valves will be given a simultaneous movement in the same direction upon a reciprocation of the rod 61.

The means for reciprocating the rod 61 so as to open and close the steam admission valves is as follows. Mounted above the shaft 3 so as to rotate therewith is a rotatable disk constituting in part a fly wheel and in part a cam, this disk being designated 68. The inner face of the disk is formed with a circular track 69, the outer wall 70 of this track forming the periphery of the disk being provided at opposite points in the diameter of the disk with the inwardly extending rounded lugs 71. Depending from a bracket 72 attached to the adjacent end piece of the casing is a bell crank lever 73, one arm of which extends horizontally and is provided with a pin 74 carrying upon it the roller 75 which is adapted to move in the track 69. The other arm 76 of this bell crank lever extends downward and is pivotally connected to the connecting rod 61. The connection between the depending arm 76 and the rod 61 is such that the arm may be adjusted longitudinally along the rod. The detailed construction for this purpose is illustrated in Fig. 10. The rod 61 is formed in two sections 61, 61ª having telescopic engagement with each other. For this purpose the section 61ª is bifurcated or formed at its extremity with two parallel arms 61ᵇ, the space between these arms being large enough to embrace the extremity of the section 61 of the rod. The section 61 upon its side edges is formed with guides 61ᶜ in which the arms 61ᵇ engage and slide. The section 61 is provided with bearing lugs 77 and 78, while the section 61ª is provided with bearing lugs 77ª. Passing through these lugs and rotatably mounted therein is the screw 79. The middle portion of this screw is plain and is rotatably mounted in a lug 80 projecting from a traveler 81 which extends from the arm 76 into the space 82. Mounted upon the screw shaft 79 is a pinion 83, and engaging with this pinion is a rack bar 84 which is held in engagement with the pinion by means of the yoke 85 pivotally mounted upon the screw shaft and abutting against the bearing lug 78. The rack bar 84 is connected to a link 86 which in turn is connected to a rod 87 depending from and pivotally connected to an arm 88 mounted on a rock shaft 89. This rock shaft passes through suitable bearings supported upon the casing of the engine, as illustrated in Fig. 1, and at its end is provided with an arm 90 (see Fig. 2) which is connected by a link 91 to a reversing lever 92 mounted upon a quadrant 93 having two notches 94 and 95. The reversing lever is provided with suitable means whereby it may be engaged with either of the notches 94 or 95 of the quadrant and thus held in any adjusted position. Upon a movement of the lever 92 in one direction, the rod 87 will be depressed, depressing the rack 84 which will cause a rotation of the pinion 83 and this in turn will shift the two sections of the connecting rod 61 toward each other or away from each other. The reversing operation performed by these parts will be later referred to. As the cam disk 68 rotates, one of the lugs 71 will engage the roller 75, depressing the arm 73 and reciprocating the rod 61 in one direction, thus turning the valves 32 in such position as to admit steam through one of the ports 28 or 29. The distance between the inner extremity of the lug 71 and the inner cam wall 96 is great enough to permit the roller 75 to pass between the lugs 71 and the cam wall. The roller will now remain down and in contact with the cam wall 96, and steam will be admitted to the rotor.

In order to move the roller 75 up or outward against the outer wall 70, we provide a pair of shiftable cut-off plates 97. These plates are arcuate in form and are guided upon the wall 96. The outer faces of the plates are curved concentrically to the inner face of the wall 70, and the ends of these cut-off plates are rounded as at 98. These cut-off cam plates 97 project beyond the inner wall 96. The cam plates 97 are each carried upon a bolt 101 which passes through a slot 100 formed through the disk 68. It will be seen that there are two slots 100 disposed in opposite portions of the disk 68, and that there are two oppositely disposed cut-off cam plates 97. The bolts 101 upon which the cam plates 97 are mounted extend through the slots 100 and are connected to opposite ends of a governor lever 102, illustrated in Figs. 6 and 12. This governor lever is formed with a hub 103 at its middle, rotatably mounted upon a hub 104 formed with the disk 68. The hub 103 is held in place by a locking ring 105, as illustrated in Fig. 12, which in turn is held in place by a set screw or other suitable means.

Extending outward from the outer face of the disk 68 are the posts 107 upon which are mounted the bell cranks 108. Each of these bell cranks has an arm 109 extending inward toward the shaft 3 and provided at their inner extremities with the governor weights 110. The other arms 111 of the bell cranks 108 are connected by links 112 to the opposite portions of the lever 102.

Pivotally mounted upon the governor balls 110 are the yokes 113, the opposite ends of the yokes being connected by means of the springs 114, these springs acting to hold the balls in the position shown in Fig. 6 but permitting the balls to shift outward under centrifugal action. It will be obvious now that when the balls are shifted outward under centrifugal action, the lever 102 will revolve, carrying with it the cam plates 97 and shifting these cam plates nearer to the lugs 71, and that as the speed of the engine increases the cam plates 97 will be forced still nearer to the lugs 71, thus cutting off the steam earlier in the cycle. If the engine is gradually decreasing in speed, the cam plates 97 will be shifted away from the lugs 71, thus cutting down expansion and increasing the period during which the live steam will flow into the piston space. This governor mechanism will thus act to keep the engine running steadily at one speed. If the speed of the engine increases, then the amount of steam is cut down and the steam is used more expansively. If, on the other hand, the speed tends to decrease for any reason, then the cut-off will occur later, thus tending to increase the speed of the engine.

It is to be noted that the governor arranged as shown in Fig. 6 and as described will operate equally well, whether the rotor is running in one direction or the other. When the engine is running in the direction of the arrow A in Fig. 6, the governor balls will be thrown outward in the direction of the arrow B. When, however, the engine is running reversely to the direction of the arrow A, the balls will fly outward in the direction of the arrow C in Fig. 6. It will be seen that when the engine is running in the direction of the arrow A, Fig. 6, the cam plates 97 will move in one direction toward the lugs 71, and that when the direction of the engine is reversed, the cam plates will move in the other direction toward the lugs 71.

The springs 114 are supported in the yokes 113 by means of screw threaded hooks 115 which act as turn buckles to expand or contract the springs 114. By adjusting these hooks 115, the tension on the springs 114 may be adjusted and thus the governor balls held from movement until a certain predetermined speed has been secured.

The action of the reversing lever 92 and its connections to the rack 84, and the action of this rack upon the rod 61 whereby the valves are reversed is as follows. When the lever is moved in the direction of the arrow in Fig. 2, from the notch 94 to the notch 95, the rod 87 will be depressed, thus forcing down the rack bar 84 which will act to turn the screw 79. It will be seen that the threads on the two portions of the screw on each side of the lug 80 are in the same direction. Hence as the rack bar is depressed, the screw will rotate in one direction and thus act to draw the section 61$^a$ toward the lug 80 carried by the arm 76 and force the section 61 away from the lug 80 and the arm 76. By reference to Figs. 4 and 6, it will be seen that a movement toward the left of the section 61$^a$ will cause the arm 60 of the steam admission valve on that side to rise, thus turning the steam admission valve on that side in such position that the port 28$^a$ will be opened and the port 29 will be closed, while a movement of the section 61 toward the left in Fig. 6 will move the valve 32 on that side so as to close the port 29 and open the port 28. A reverse movement of the rack bar 84 will cause a reverse movement of the valves so that communication between the steam pipes 30 and the ports 28 will be closed, while communication will be established between the steam pipes 30 and the ports 29.

In the construction shown, it is only necessary to give the screw shaft 79 about four revolutions in order to reverse the engine, and this of course is easily accomplished by giving the rack 84 sufficient length so that it is in proportion to the diameter of the pinion 83.

It will be seen that as the cam disk 68 revolves, the lugs 71 projecting from the rim 70 will alternately contact with the roller 75, thus depressing the roller. As a lug 71 contacts with the roller 75, the roller will be depressed, thus shifting the connecting rod 61 in one direction, thus opening the valves 32. These valves will stay open until the ends of the cam plates 97 strike the rollers 75, whereupon the rollers are forced outward to the position shown in Fig. 8 which closes the valves 32. The valves remain closed until lugs 71 again strike the rollers 75. It will thus be seen that the valves are alternately opened and closed, and that the length of time that the valves remain open for the admission of steam, in other words, the point of cut-off, is determined by the proximity of the end of the cam plate 97 to the adjacent lug 71.

It is to be noted that the governor operates the same when the engine is running in one direction as in the other, and that no adjustment of this governor is needed when the engine is reversed.

A detail view of one of the exhaust valves and the exhaust valve casing is illustrated in Fig. 13.

It will be seen that the inner face of the rotor casing 2 is cut away to form the port 2ª, and that the valve 38 is approximately cylindrical in form and provided with a transversely extending passage 39, which when the valve is turned registers with the exhaust port 2ª. The valve 38 is not absolutely cylindrical, as if it were cylindrical it would, when turned in the position shown in Fig. 13, project slightly through the port 2ª and thus act to slightly impede the travel of the blades on the rotor which would thus strike the slightly projecting rounded portion of the valves. The circumference of the valve 38 is cylindrical for its greater portion, but parallel with the passage 39 the face of the valve 38 is cut away as at 116, the face of this cutaway portion being very slightly convex and conforming to the curvature of the inner face of the rotor casing 2, so that when the valve is turned in the position shown in Fig. 13, the cutaway face 116 of the valve will be practically a continuation of the inner face of the rotor casing. The face of the valve 38 upon which the passage 39 opens is also slightly concave as at 117, for the same purpose. The exhaust valves are movable through a quarter circle into a position wherein the passages 39 register with the passage 37 and the port 2ª, or into a position at right angles to the passage 37 and the port 2ª. In order to secure this oscillation of the valves 38, each of the valves is provided with a spindle 118 which extends out through the valve casing formed in the rotor and has attached thereto the radially projecting arm 119, as shown in Figs. 2 and 5. There are four exhaust valves, as before described, arranged in two pairs, the valves of each pair being arranged on either side of the abutment casing 20. The valves of each pair are arranged in quartering relation to each other so that one of the exhaust valves shall be open while the other is closed. The arms 119 of the exhaust valves are connected to each other by links 120, these links in turn being connected to a rocker arm 121 fast on the rock shaft 89. It will be remembered that this rock shaft has mounted upon it the reversing arm 90 which is connected by the link 91 to the reversing lever 92. It will be seen that when the reversing lever 92 is shifted from one notch to the other of the quadrant 93, the shaft will be rocked, thus reversing the action of the steam admission valves and at the same time reversing the position of the exhaust valves, so that one valve of each pair which was before open is now closed and the other valve which was before closed is in turn open, as is illustrated in Fig. 4. Where necessary or desirable, the links 120 may be formed in sections pivoted to each other, the sections being supported upon a radius arm 122, as illustrated in Fig. 2.

Preferably the valve actuating mechanism, the reversing gear actuating mechanism, the governor and the abutment actuating mechanism are inclosed by end plates 123, as illustrated in Figs. 1 and 3. These end plates are bolted to annular flanges formed upon the rotor casing 2 and entirely house the mechanism for operating the valves and the abutments.

As illustrated in Fig. 2, the end plate 123 is provided with boxes 124 for the passage of the rods 61, 61ª, and is also provided with the box 125 for the guidance and passage of the rod 87. The shaft 3 passes through the center of each end plate, as illustrated in Fig. 3, and each end plate is provided with a suitable stuffing box 126 through which the shaft passes. These end plates are formed with handle openings closed by covers 127. By removing these covers, the mechanism in the interior may be easily oiled or otherwise attended to. By removing the end plates entirely, the reversing and governing mechanism, and the mechanism for controlling the abutments may be easily repaired or replaced. Further, by removing these plates 123, the rings 51 and 12 may be easily removed, thus permitting the removal of the rotor, the replacement of the blades 9, or the replacement or repair of packing around the blades. The end plates 123 are also provided with drain cocks 128 whereby oil or water may be withdrawn from the end of the casing.

Each abutment is provided with packing whereby it may have steam-tight engagement with the walls of the abutment casing, the walls of the rotor casing and the face of the rotor. To this end the abutment as illustrated in Fig. 15 is longitudinally grooved at its lower end as at 129. Located in this groove is the longitudinal packing strip 130 made in two sections, the sections being outwardly forced by means of springs 131. These packing strips are downwardly forced by means of springs 132 contained in sockets formed in the under face of the abutment. The ends of the abutment are cut away as at 134 (see Fig. 15) for the reception of end packing strips 135. These packing strips are longitudinally slotted at their upper ends as at 136 for engagement with pins 137 projecting from the cutaway ends of the abutment, while the lower ends of the packing strips 135 are longitudinally slotted as at 138 for engagement with pins 139 projecting from the sections of the strips 130. Coil springs 140 are disposed in sockets 141 in the ends of the cutaway portions of the abutment and press outwardly against the end strips 135. Each side of the abutment is provided with grooves 142 in which are disposed the transversely extending packing strips 143 which are each made in two sections and forced laterally by intermediate springs 144, these packing strips in turn being forced outwardly by springs 145 placed behind them.

In order to prevent the leakage of steam between the rotor and the casing around the ring plates 12, we form a circumferential packing recess 138 (see Fig. 3) which opens upon the side face of the recess 15. Located in this recess 138 is the sectional packing ring 139 (see Fig. 14). This packing ring is U-shaped in cross section and is preferably formed in two angular sections. Each recess 138 communicates by passages 140 (see Fig. 14) with the ports 28 and 29 so that steam will pass into the space behind each packing ring and force it outward.

What we claim is:

1. In a rotary engine, a bladed rotor, a casing therefor, oppositely disposed abutments mounted in the casing to contact with the face of the rotor, a cam driven by the rotor, a connecting rod reciprocated by the cam, and bell crank levers supported on the rotor casing and engaging the said abutments and said connecting rod whereby the abutments are moved simultaneously with each other.

2. In a rotary engine, a bladed rotor, a rotor casing, oppositely disposed sliding abutments mounted in the casing to contact with the face of the rotor, means for shifting the abutments as each blade comes into proximity thereto, the rotor casing being provided with oppositely disposed pairs of admission ports, each pair being located on each side of one of the abutments, a pair of exhaust ports also located on each side of the abutment but beyond the admission ports, oscillating valves controlling the passage of steam through the admission ports, said valves being shiftable to move them into coaction with one or the other of said admission ports, oscillatable valves controlling the passage of exhaust fluid through the exhaust ports, a rock shaft mounted upon the rotor casing, manually actuated means for rocking the said shaft, an arm projecting from the shaft, links connecting all of said exhaust valves to said arm, means for oscillating the admission valves and means connected to said rock shaft for shifting both of said admission valves simultaneously with the shifting of the exhaust valves to cause each valve to coact with one or the other of its corresponding ports.

3. In a rotary engine, a bladed rotor, an inclosing casing, oppositely disposed sliding abutments mounted in the casing to contact with the face of the rotor, means for shifting the abutments outward as each blade comes into proximity thereto, spaced fluid supply ducts located on each side of each abutment, diametrically opposed valves coacting with one or the other of said ducts, a connecting rod operatively connected to the valves, means for oscillating the connecting rod to oscillate the valves and to admit or cut off steam through one or the other of the passages, and means for changing the length of the connecting rod so as to cause the valves to coact with one or the other of the ducts and thus reverse the engine.

4. In a rotary engine, a bladed rotor, an inclosing casing, a sliding abutment in the casing contacting with the face of the rotor, means for shifting the abutment outward as each blade comes into proximity thereto, the rotor casing being provided with a pair of fluid supply ducts located one on each side of the abutment, an oscillating valve for permitting or cutting off the passage of steam through either of said passages, said valve being rotatably shiftable to coact with one of said passages and cut off the other passage, a cam driven by the rotor, an arm reciprocated by the cam, a connecting rod operatively connected to said valve to oscillate the same, a sliding connection between the reciprocating member and said rod, and means for shifting the connecting rod relative to the reciprocating member to shift the valve.

5. In a rotary engine, a rotor, a rotor casing, opposed pairs of fluid supply ducts, oscillating valves, one for each pair of ducts and controlling the passage of steam therethrough, said valves being shiftable to coact with one or the other of the ducts of each pair, a connecting rod extending between the valves for oscillating the same, a reciprocating arm, means operated by the rotor for reciprocating the arm, a screw carried on the arm, said screw engaging the connecting rod, a reversing lever, and means connected to the reversing lever for operating said screw to reverse the valves.

6. In a rotary engine, a rotor, an inclosing casing, opposed sliding abutments mounted in the casing to contact with the face of the rotor, means for shifting the abutments outward as each blade comes into proximity thereto, the casing being provided with two pairs of steam admission ports located one on each side of each abutment, oscillating cut-off valves coacting with one or the other of each pair of admission ports, arms projecting from the valves, a cam mounted to rotate with the rotor, a bell crank lever supported from the rotor casing, one arm of the bell crank lever engaging in said cam, a sectional connecting rod operatively connected at opposite ends to the arms projecting from the admission valves, a rotatable screw carried upon the depending end of the bell crank lever and engaging ears on the opposite sections of the connecting rod, a valve reversing lever, a rack bar connected to said lever, and a pinion on the screw with which said rack bar engages whereby the screw may be turned in one or the other direction to shift the connecting rod relative to the bell crank lever and reverse the valves.

7. In a rotary engine, a bladed rotor, an inclosing casing, oppositely disposed sliding abutments mounted in the casing to contact with the face of the rotor, means for shifting the abutments outward as each blade comes into proximity thereto, the casing being provided with opposed pairs of steam supply ducts, one pair for each of the abutments, the ducts of each pair of ducts being located on opposite sides of the corresponding abutment, opposed oscillating valves for controlling the passage of steam through the ducts, each of said valves being shiftable to coact with one or the other of the ducts, a sectional connecting rod operatively connected at opposite ends to said valves for oscillating the same simultaneously, a cam rotating with the rotor, an oscillating member operated by the cam and engaging said connecting rod to oscillate the same, means for shifting the sections of the connecting rod relative to the oscillating member to reverse the valves, oppositely disposed pairs of exhaust valves located in the casing on each side of each of the abutments, the valves of each pair being oppositely disposed to each other, and means for reversing the position of the exhaust valves simultaneously with the reversing of the admission valves to reverse the engine.

8. In a rotary engine, a bladed rotor, an inclosing casing, oppositely disposed sliding abutments mounted in the casing to contact with the face of the rotor, means for shifting the abutments outward as each blade comes into proximity thereto, spaced fluid supply ducts located on each side of each abutment, diametrically opposed valves coacting with one or the other of said ducts, a connecting rod operatively connected to the valves, means for reciprocating the connecting rod to oscillate the valves and to admit or cut off steam through one or the other of the ducts, a reversing lever, exhaust valves operatively connected to said reversing lever and means operated by the reversing lever and coacting with the connecting rod for changing the length of the connecting rod as the reversing lever is moved in one or the other direction thereby to cause the admission valves to coact with one or the other of the ducts and thus reverse the engine.

9. In a rotary engine, a bladed rotor, an inclosing casing, a sliding abutment in the casing contacting with the face of the rotor, means for shifting the abutment outward as each blade comes into proximity thereto, the rotor casing being provided with opposed pairs of fluid supply ducts located one on each side of the abutments and with a pair of exhaust ports located on each side of the pair of supply ducts, a shiftable valve for admitting or cutting off the passage of steam through one or the other of said ducts, said valve being rotatably shiftable to co-act with one of said ducts and cut off the other, a cam driven by the rotor, an arm reciprocated by the cam, a connecting rod operatively connected to said valve to reciprocate the same, a sliding connection between the reciprocating arm and said connecting rod, a reversing lever operatively connected to the exhaust valves, and connections between the reversing lever and said connecting rod for shifting the connecting rod relative to the reciprocating member to shift the valve upon a shifting of the reversing lever.

10. In a rotary engine, a rotor, a casing having an inlet port, an inlet valve mounted in the casing and controlling the inlet port, a bell crank lever, one arm thereof carrying a roller and the other arm being operatively connected to the valve, a cam rotating with the rotor and having a cam track in which said roller moves, one wall of the cam track being provided at a predetermined point with an inwardly projecting rounded lug adapted to engage the roller and shift the bell crank lever in one direction, and an arcuate member shiftably mounted upon the cam and forming a portion of the other wall of the cam track for forcing the bell crank lever in the opposite direction, said arcuate member being shiftable toward or from the said lug.

11. In a rotary engine, a rotor, a casing having an inlet port, an inlet valve mounted in the casing and controlling the inlet port, a cam rotating with the rotor and having a cam track, one wall of the cam track being provided at a predetermined point with a projecting lug, a member operatively connected to the valve and having a roller disposed in said cam track, an arcuate member shiftably mounted upon the cam and forming a portion of the other wall of the cam track for forcing the said member in the opposite direction to the direction in which it is forced by said lug, said arcuate member being shiftable toward or from said lug.

12. In a rotary engine, a rotor, a casing, an inlet valve controlling the admission of motive fluid to the casing, a centrifugal governor rotating with the rotor and including oppositely disposed pivoted weights, means operated by the governor for controlling the period during which the inlet valve remains open, and springs connecting the weights to each other and tending to prevent the outward movement of the weights under the action of centrifugal force, and means adjusting the tension of the springs.

13. In a rotary engine, a rotor, a casing inclosing the rotor, an inlet valve controlling the admission of motive fluid to the casing, a disk rotating with the rotor, a cam track formed upon said disk, said cam track at one point in its circumference having an inwardly extending rounded protuberance, a valve operating member engaging said cam track and adapted to be shifted inward by contact with said protuberance, an arcuate cut-off plate forming a portion of the other wall of said cam track and shiftable toward or from the protuberance and acting to return the valve operating member to its original position, an arm mounted upon the same axis as the disk but independently removable with relation thereto, a bell crank lever mounted upon the disk to rotate therewith, a connection between the bell crank lever and the arm, and a governor ball carried upon the other end of the bell crank lever.

14. In a rotary engine, a rotor, a casing, diametrically opposed inlet valves for controlling the admission of steam to the casing, a shaft upon which the rotor is mounted passing through the casing, a disk carried upon said shaft, said disk having a cam track upon one face thereof, the wall of said cam track being provided at opposite points in its diameter with rounded protuberances, the opposite wall of the cam track being increased in width for a distance on each side of the protuberances, a transversely extending lever rotatably mounted upon the shaft, cut-off cam plates mounted upon the opposite ends of said lever, and coacting with the inner wall of said cam track, said plates being shiftable with the ends of the lever toward or from the protuberances on the outer wall of the cam track, oppositely disposed bell crank levers reversely arranged with relation to each other and mounted upon the disk, arms connecting the bell crank levers to the first named lever, balls mounted upon the inner ends of the bell crank levers, and springs connecting the bell crank levers to each other and resisting the outward movement of the balls.

15. In a rotary engine, a rotor, a casing surrounding the rotor, a valve chamber formed in the casing and having an opening communicating with the interior of the casing, and a rotary valve located in said chamber, said valve being cylindrical and having a diametrically extending port adapted to register with the opening in the valve casing, the face of the valve adjacent to one opening of the port being slightly concave, the face of the valve at right angles to the direction of the port being also concave, said concavities forming each a continuation of the interior face of the casing when the valve is turned into one or the other of its positions.

16. In a rotary engine, a slidable abutment, the end face of the abutment being grooved along its middle, a packing strip carried in said end face and resiliently forced outward, lateral packing strips on the ends of the abutment disposed upon the opposite faces of the abutment, resilient means forcing said packing strips outward, and oppositely disposed transverse packing strips carried upon the ends of the abutment above the lateral packing strips, and means for forcing said packing strips outward.

17. In a rotary engine, a rotor, a rotor casing, said casing having steam inlet ports, the casing being provided on each side with a circumferential recess opening upon the inner face of the casing, and a packing strip U-shaped in cross section supported in said recess with the hollow side of the packing strip inward, said packing strip contacting with the rotor and the recess being connected to the steam inlets to permit steam to enter behind the packing to force it against the rotor.

18. In a rotary engine, a rotor, a rotor casing, radially shiftable abutments carried in the rotor casing and contacting with the face of the rotor, bell crank levers operatively connected to the abutments, a connecting rod extending between said bell crank levers and operatively connecting the same, a cam rotatable with the rotor and having a cam track on one face thereof, and a bell crank lever, one arm of which carries a roller engaging said cam track, the other arm being operatively connected to said connecting rod.

In testimony whereof, we affix our signatures in presence of two witnesses.

FLOYD D. LAMBERT. [L. S.]
RALPH R. RESCH. [L. S.]

Witnesses:
A. M. SANKEY,
DELPHA HOUGH.

---

Copies of this patent may be obtained for five cents each, by addressing the "Commissioner of Patents, Washington, D. C."